US012308547B1

(12) United States Patent
Knaga

(10) Patent No.: US 12,308,547 B1
(45) Date of Patent: May 20, 2025

(54) THREE-PRONG JACK CONSTRUCTION

(71) Applicant: Joseph Michael Knaga, Carbondale, IL (US)

(72) Inventor: Joseph Michael Knaga, Carbondale, IL (US)

( * ) Notice: Subject to any disclaimer, the term of this patent is extended or adjusted under 35 U.S.C. 154(b) by 0 days.

(21) Appl. No.: 18/774,229

(22) Filed: Jul. 16, 2024

Related U.S. Application Data

(60) Provisional application No. 63/527,922, filed on Jul. 20, 2023.

(51) Int. Cl.

| | |
|---|---|
| ***H01R 13/08*** | (2006.01) |
| ***H01R 13/717*** | (2006.01) |
| ***H01R 24/68*** | (2011.01) |
| ***H01R 27/02*** | (2006.01) |

(52) U.S. Cl.
CPC ......... *H01R 13/08* (2013.01); *H01R 13/7175* (2013.01); *H01R 24/68* (2013.01); *H01R 27/02* (2013.01)

(58) Field of Classification Search
CPC .... H01R 13/08; H01R 13/7175; H01R 24/68; H01R 27/02
See application file for complete search history.

(56) References Cited

U.S. PATENT DOCUMENTS

| | | | | | |
|---|---|---|---|---|---|
| 2,276,557 | A | 3/1942 | Woodhead | | |
| 2,734,177 | A | 2/1956 | Gilbert | | |
| 2,927,297 | A * | 3/1960 | Hubbell | H01R 13/055 | 439/695 |
| 3,519,980 | A * | 7/1970 | Mosley | H01R 24/28 | 439/459 |
| 3,808,583 | A * | 4/1974 | Liberman | H01R 13/562 | 439/473 |
| 4,284,318 | A * | 8/1981 | Wiley | H01R 13/655 | 439/695 |
| 2006/0030203 | A1* | 2/2006 | Ohi | G09F 3/00 | 439/488 |
| 2014/0177169 | A1* | 6/2014 | Restrepo | H05K 5/0247 | 361/752 |
| 2023/0187883 | A1* | 6/2023 | Jensen | F21V 5/006 | 439/40 |

* cited by examiner

*Primary Examiner* — Travis S Chambers
(74) *Attorney, Agent, or Firm* — Grace J. Fishel

(57) ABSTRACT

An electrical jack or plug with a rectangular housing having a back wall and an insulated plate closing an open top. Parallel live and neutral flat prongs pass through apertures in the insulated plate with a longer ground prong passing through an aperture in the insulated plate below and between the live and neutral prongs. Each of the prongs has an integral L-shaped foot attached with a fastener to an underside of the insulated plate. An insulated electric line containing live, neutral and ground wires is secured in an aperture in the back wall with a pressure plate. The insulated wires are connected in the housing to the prongs with the fasteners for attaching the feet. The jack or plug optionally has at least one USB port and at least one LED for illuminating a logo on the insulated plate.

10 Claims, 4 Drawing Sheets

THREE-PRONG JACK CONSTRUCTION

BACKGROUND OF THE INVENTION

Field of the Invention

The present invention relates to a three-prong electrical jack that is less likely to fail or pull out of a receptacle into which it is inserted. Each prong has an integral L-shaped foot attached to the underside of an insulated plate closing a rectangular housing.

Brief Description of the Prior Art

Three-prong electrical plugs or jacks can fail for several reasons. The prongs on a plug are frequently bent or damaged due to antiquated design of all current plug geometry. Prongs are frequently damaged or completely detached from regular use, due to poor cord connection, weak plug housings, and poor blade connections, by being pulled to the left or right. Plugs easily pull out of the wall often resulting in blade damage. The internal wiring connections may be disrupted or broken. Loose connections can cause intermittent power interruptions or a complete loss of electrical contact. In addition, if the insulation around the wire is damaged, this can result in a short circuit.

BRIEF SUMMARY OF VARIOUS PREFERRED EMBODIMENTS OF THE INVENTION

This section provides a general summary of the disclosure, and is not a comprehensive disclosure of its full scope or all of its features.

In accordance with the various embodiments of the present invention, a three-prong electrical jack or plug has prongs that are L-shaped with a foot embedded in the housing and a leg protruding from a front face of the jack or plug making them stronger and less likely to bend or pull out from the plug.

In many instances the electrical jack or plug has an open topped rectangular housing with a back wall and an insulated plate closing the open top, live and neutral flat electrically conductive metal prongs mounted parallel to each other in the apertures in the insulated plate, and a third ground prong mounted in a third aperture in the insulated plate. Each of the prongs has an integral L-shaped foot attached to an underside of the insulated plate with a fastener. In an embodiment, the L-shaped foot of the live and neutral prongs are longitudinally aligned but facing away from each other while the L-shaped foot of the ground prong is parallel to the feet of the other two prongs.

In another embodiment, there is an aperture in the back wall adapted to pass through an insulated electric line containing an insulated live wire, an insulated neutral wire and an insulated ground wire with a pressure plate in the back wall adapted to secure the insulated electric line in the aperture.

In still other embodiments there is at least one USB port in a side wall of the rectangular housing and/or at least one LED positioned in the rectangular housing under control of a switch located in a side wall of the rectangular housing.

In some implementations the insulated plate is at least partially translucent with a logo on an outer surface, said logo back illuminated by the at least one LED.

In a still further aspect the rectangular housing has a width substantially equal to a width of an outlet wall plate and in some cases specifically the housing is substantially 3" wide, 1½" tall and ⅞" deep.

BRIEF DESCRIPTION OF THE SEVERAL VIEWS OF THE DRAWINGS

In the accompanying drawings in which several of various possible embodiments of the invention are illustrated, corresponding reference characters refer to corresponding parts throughout the several views of the drawings in which.

DETAILED DESCRIPTION OF AT LEAST ONE PREFERRED EMBODIMENT OF THE INVENTION

Figure 1:
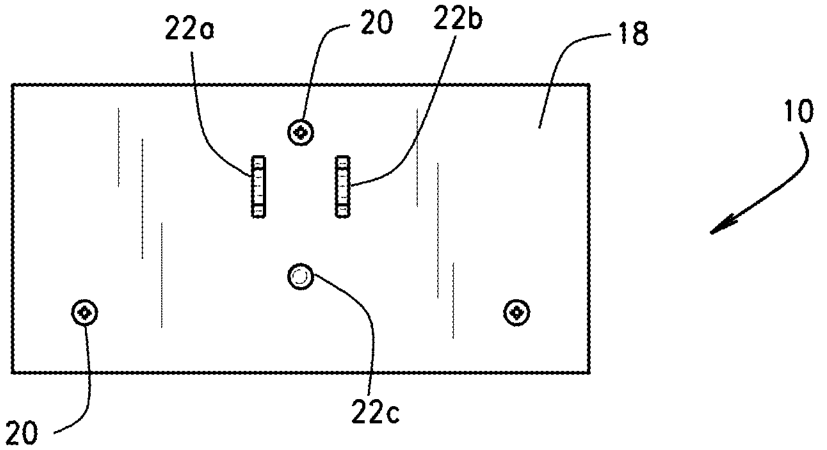
FIG. 1 is a front elevation of a three-prong jack or plug in accordance with the present invention.
Figure 2:
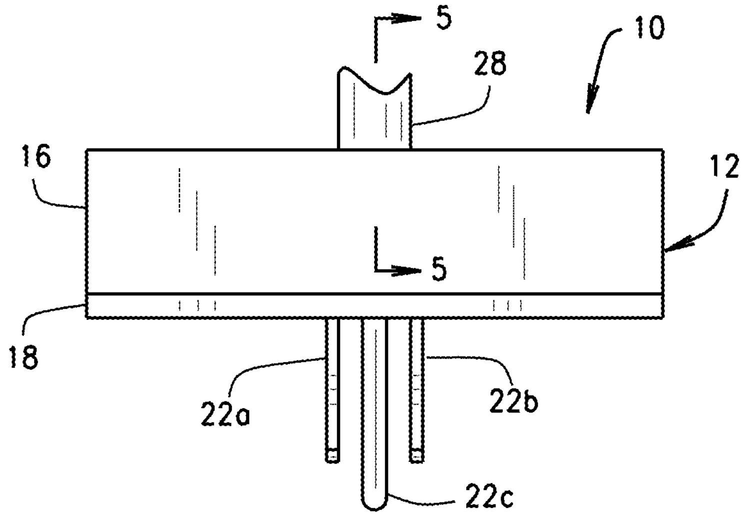
FIG. 2 is a top view thereof.
Figure 3:
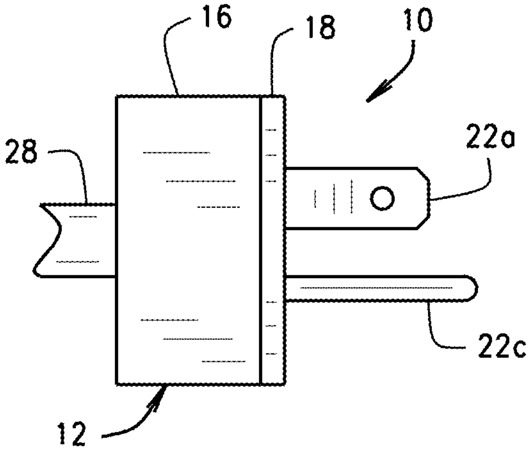
FIG. 3 is a side view thereof.

Referring to the drawings more particularly, a three-prong electrical plug or jack or plug 10 in accordance with the present invention is formed of several components that work together to provide a safe and reliable connection for electrical devices.

Jack or plug 10 includes an open topped rectangular housing 12 with a back wall 14, sidewalls 16 and a plate 18 attached with screws 20 for closing the open top. Plate 18 is made of a durable material, such as plastic, which provides insulation and protection and is designed to accommodate the internal components and support prongs 22.

Jack or plug 10 has three prongs 22, also often referred to as blades or pins, formed of a conductive material, such as brass or copper, which allows electricity to flow through them. First and second prongs 22*a* and 22*b* are flat and are mounted parallel to each other in first and second apertures in insulated plate 18. First prong 22*a* is a live prong adapted to carry and electric current and second prong 22*b* is a neutral prong adapted to complete an electric circuit. Third prong 22*c* is a ground prong provided as a safety feature to protect against electric shocks and is mounted in a third aperture in insulated plate 18. Third prong 22*c* is round and longer than the first and second prongs 22*a* and 22*b* and is positioned below and between the first and second prongs.

Figure 6:
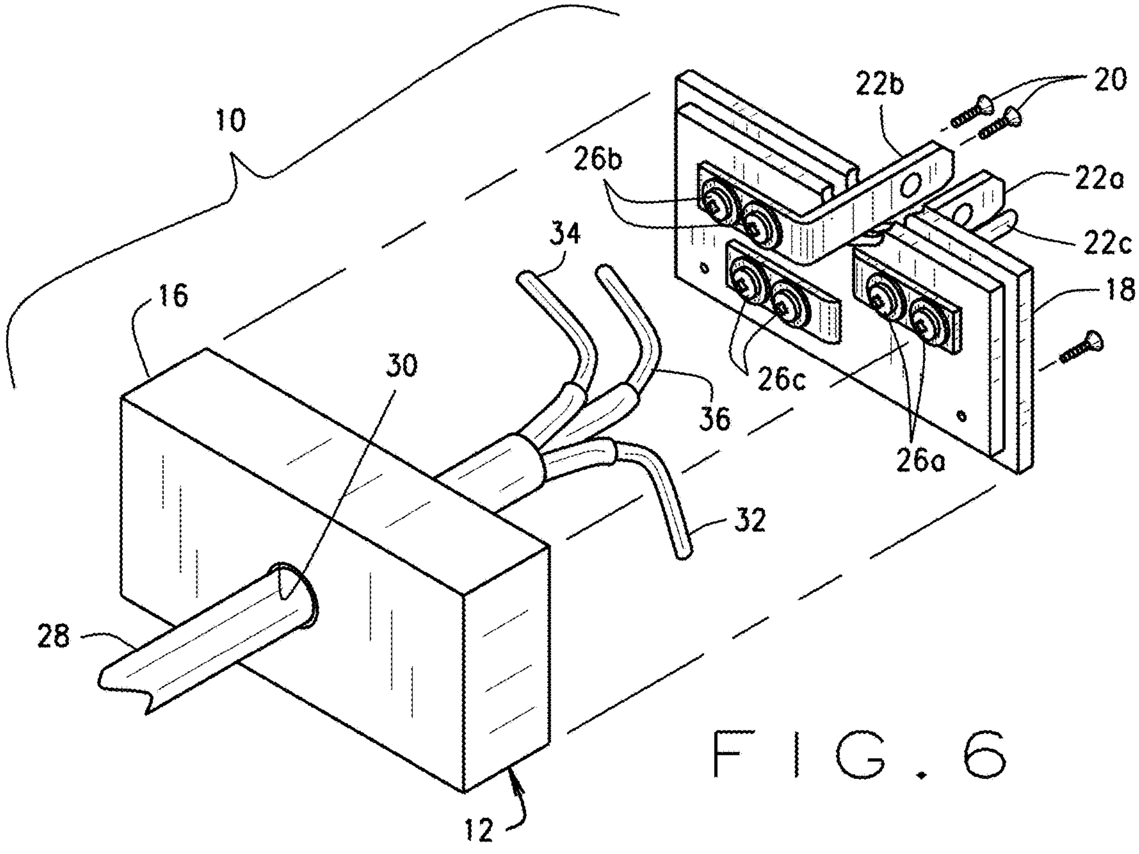
FIG. 6 is an exploded view thereof.

As shown in FIG. 6, prongs 22 are L-shaped with a foot 24 of the prong attached to an underside of insulated plate 18 with the prong protruding from the front surface of the plate. This arrangement is more robust that the usual manner to hold the prongs in place which includes clips, tabs or other mechanisms. Feet 24 are attached to insulated plate 18 with terminals or screws 26 and provide a stable platform for the prongs 22 within housing 12. With continuing reference to FIG. 6, foot 24 of first and second prongs 22*a* and 22*b* are aligned but facing away from each other. Foot 24 of third prong 22*c* is parallel to foot 24 of first and second prongs 22*a* and 22*b*.

An insulated electric line 28 passes through an aperture 30 in back wall 14 of housing 12 for connection with terminals or screws 26 for connecting the electrical wire to prongs 22. Terminals or screws 26 are typically made of brass or another conductive metal. In use, the insulation on electric line 28 is stripped inside housing and the wire separated into an insulated hot wire 32, insulated neutral wire 34 and insulated ground wire 36. Hot wire 32 connects terminal 26*a* to first prong 22*a*, while a neutral wire 34 connects terminal 26*b* to neutral prong 22*b*. Ground wire 36 is connected to a ground terminal 26C. Terminals 26*a*, 26*b* and 26*c* may be doubled for additional security.

Figure 7:
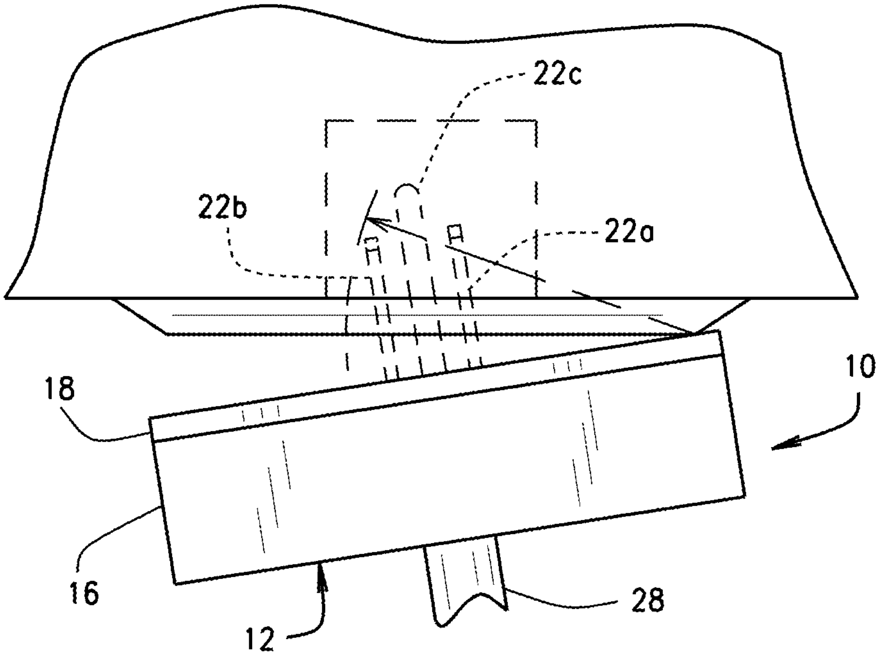
FIG. 7 illustrates the jack or plug being pulled to the right.
Figure 8:
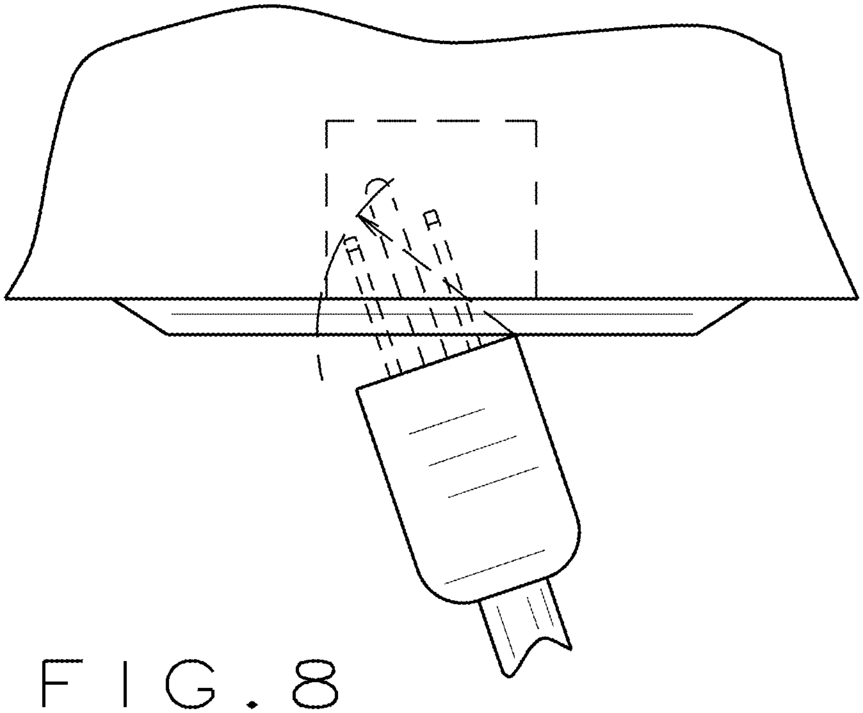
FIG. 8 PRIOR ART
FIG. 8 illustrates what happens when a prior art plug is pulled to the right.

As shown in the drawings rectangular housing 12 is approximately 3" wide, 1½" tall and ⅞" deep. The height is about that of a standard plug and the width is about equal to the width of a standard outlet wall plate. This is important as shown in FIGS. 7 and 8 in the event of a tug to right or the left. As compared to the prior art, the point of rotation is moved from next to prongs 22 to more than an inch past where the prongs enter the outlet. The result is that jack or plug 10 is less likely to be pulled from the outlet and prongs 22 are less likely to be bent or otherwise damaged.

Figure 4:
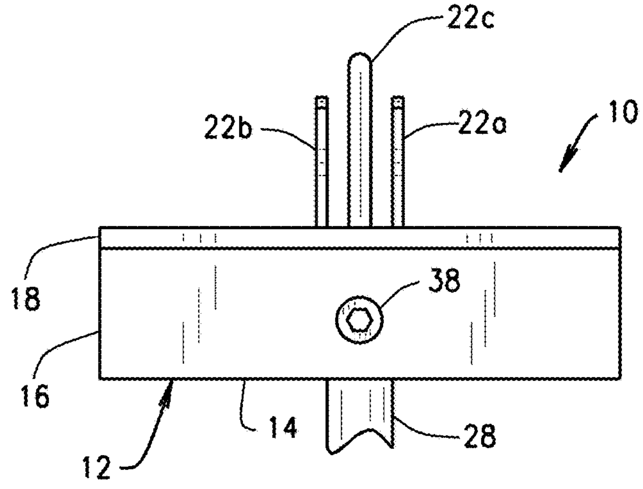
FIG. 4 is a bottom view thereof.
Figure 5:
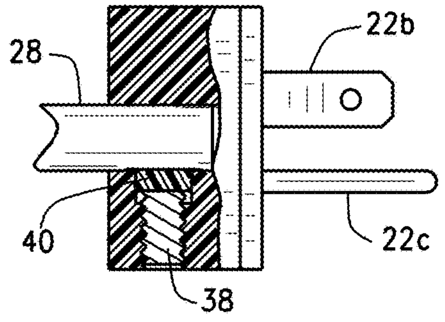
FIG. 5 is a sectional view taken along the plane of 5-5 in FIG. 2.

Still another feature of the invention is the provision of a set screw 38 and pressure plate 40 shown in FIGS. 4 and 5 which securely clamps wiring 28 as it enters housing 12 thus shielding hot, neutral and ground wires 32, 34 and 36 from pulling forces and from being disconnected from terminals 26*a*, 26*b* and 26*c*. Additionally, the insulation on electric line 28 is less likely to wear around aperture 30 which can cause the plug to short out.

Figure 9:
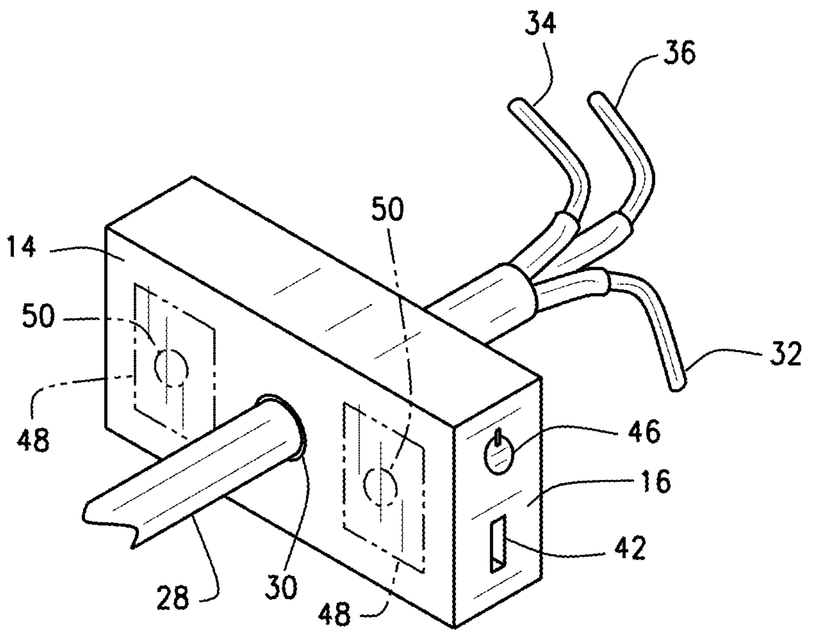
FIG. 9 is a perspective view of a jack or plug with an illuminated logo on the front and a USB type A port in one of the housing sidewalls; and, FIG. 10 is a perspective view of an opposite side of the housing with two USB type C ports.
Figure 10:
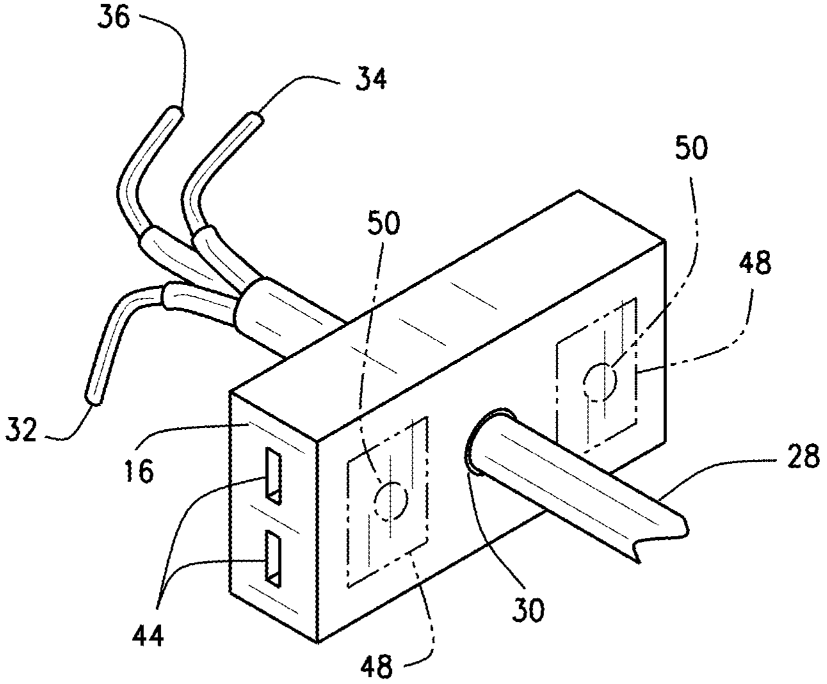

Turning to FIGS. 9 and 10, USB ports may be included in plug or jack 10 to provide convenient charging options. As shown a type A USB port 42 is provided in one sidewall and two type C USB ports 44 are provided in an opposite side wall. Plug or jack 10 may also serve as a night light by the inclusion of one of more LEDs under control of a switch 46 provided on one of the sidewalls of housing 12. A logo 48 may also be included on the front face of the plate 18 and back lit with one or more LEDs 50 when the plate is at least partially translucent.

As various changes could be made in the above constructions without departing from the scope of the invention, it is intended that all matter contained in the above description or shown in the accompanying drawings shall be interpreted as illustrative and not in a limiting sense.

What is claimed is:

1. An electrical plug comprising an open topped rectangular housing with a back wall and an insulated plate closing the open top, first and second flat electrically conductive metal prongs mounted parallel to each other in first and second apertures in the insulated plate, said first prong being a live prong adapted to carry an electric current and said second prong being a neutral prong adapted to complete an electric circuit, a third round electrically conductive metal prong being a ground prong adapted to provide a path to ground and mounted in a third aperture in the insulated plate, said third prong longer than the first and second prongs and positioned below and between the first and second prongs, each of said live, neutral and ground prongs having an integral L-shaped foot attached to an underside of the insulated plate with a fastener, said L-shaped foot of the first and second prongs aligned but facing away from each other, said L-shaped foot of the third prong parallel to the foot of the first and second prongs, an aperture in the back wall adapted to pass through an insulated electric line containing an insulated live wire, an insulated neutral wire and an insulated ground wire, a pressure plate in the back wall adapted to secure the insulated electric line in the aperture.

2. The electrical plug of claim 1 wherein the rectangular housing has a width substantially equal to a width of an outlet wall plate.

3. The electrical plug of claim 2 wherein the housing is substantially 3" wide, 1½" tall and ⅞" deep.

4. The electrical plug of claim 1 wherein each foot is attached to the insulated plate with two fasteners.

5. An electrical connector assembly comprising an open topped rectangular housing with a back wall and an insulated plate closing the open top, first and second flat electrically conductive metal prongs mounted parallel to each other in first and second apertures in the insulated plate, said first prong being a live prong adapted to carry an electric current and said second prong being a neutral prong adapted to complete an electric circuit, a third round electrically conductive metal prong being a ground prong adapted to provide a path to ground and mounted in a third aperture in the insulated plate, said third prong longer than the first and second prongs and positioned below and between the first and second prongs, each of said live, neutral and ground prongs having an integral L-shaped foot attached to an underside of the insulated plate with a fastener, said L-shaped foot of the first and second prongs aligned but facing away from each other, said L-shaped foot of the third prong parallel to the foot of the first and second prongs, an aperture in the back wall adapted to pass through an insulated electric line containing an insulated live wire, an insulated neutral wire and an insulated ground wire, a pressure plate in the back wall adapted to secure the insulated electric line in the aperture, at least one USB port in a side wall of the rectangular housing and at least one LED positioned in the rectangular housing under control of a switch located in a side wall of the rectangular housing.

6. The electrical connector assembly of claim 5 wherein the insulated plate is at least partially translucent with a logo on an outer surface, said logo back illuminated by the at least one LED.

7. The electrical connector assembly of claim 5 wherein the pressure plate in the back wall is under control of a set screw in a side wall of the open topped rectangular housing for securing the insulated electric wire in the aperture in the back wall.

8. The electrical connector assembly of claim 5 wherein the rectangular housing has a width substantially equal to a width of an outlet wall plate.

9. The electrical connector assembly of claim 8 wherein the open topped rectangular housing is substantially 3" wide, 1½" tall and ⅞" deep.

10. The electrical connector assembly of claim 5 wherein each foot is attached to the insulated plate with two fasteners.

* * * * *